US010648672B2

United States Patent
Gomez del Campo

(10) Patent No.: US 10,648,672 B2
(45) Date of Patent: *May 12, 2020

(54) METHOD AND APPARATUS FOR ASSISTING WITH THE COMBUSTION OF FUEL BY USING A PLASMA GENERATOR WITHIN A FUEL NOZZLE

(71) Applicant: FCG Plasma Solutions LLC, Weston, FL (US)

(72) Inventor: Felipe Gomez del Campo, Weston, FL (US)

(73) Assignee: FGC PLASMA SOLUTIONS LLC, Cleveland, OH (US)

( * ) Notice: Subject to any disclaimer, the term of this patent is extended or adjusted under 35 U.S.C. 154(b) by 886 days.

This patent is subject to a terminal disclaimer.

(21) Appl. No.: 15/239,993

(22) Filed: Aug. 18, 2016

(65) Prior Publication Data

US 2016/0356501 A1    Dec. 8, 2016

Related U.S. Application Data

(63) Continuation of application No. 14/707,427, filed on May 8, 2015, now Pat. No. 9,423,133.

(Continued)

(51) Int. Cl.
*F02C 7/266* (2006.01)
*F23R 3/28* (2006.01)
(Continued)

(52) U.S. Cl.
CPC .............. *F23R 3/286* (2013.01); *F02C 7/264* (2013.01); *F02C 7/266* (2013.01); *F23C 99/001* (2013.01);
(Continued)

(58) Field of Classification Search
CPC ...... F23R 3/12; F23R 3/14; F23R 3/28; F23R 3/283; F23R 3/286; F23R 3/34;
(Continued)

(56) References Cited

U.S. PATENT DOCUMENTS

| | | |
|---|---|---|
| 4,023,351 A | 5/1977 | Beyler |
| 9,423,133 B2 * | 8/2016 | Gomez del Campo .. F23R 3/14 |

(Continued)

OTHER PUBLICATIONS

International Search Report for corresponding Int'l Pat. Appl. No. PCT/US2015/029864, 3 pages.

*Primary Examiner* — William H Rodriguez
(74) *Attorney, Agent, or Firm* — Tarolli, Sundheim, Covell & Tummino LLP

(57) ABSTRACT

An apparatus and method for assisting with the combustion of fuel are described. The apparatus includes a swirler assembly and a fuel nozzle. Fuel is directed into a fuel nozzle mixing chamber and combines with air therein to form a fuel-air mixture. At least one plasma generator, at least partially within the fuel nozzle, generates an at least one of an at least partially ionized air-fuel mixture and an at least partially dissociated air-fuel mixture ("at least partially I/D air-fuel mixture") via a plasma generator discharge. A combustion chamber inlet admits the at least partially I/D air-fuel mixture from the plasma generator into a combustion chamber internal volume. Combustion air flows through the swirler body and into the combustion chamber internal volume. Combustion of the at least partially I/D air-fuel mixture with the combustion air occurs at least partially within the combustion chamber internal volume to responsively produce products.

36 Claims, 11 Drawing Sheets

Related U.S. Application Data

(60) Provisional application No. 61/990,314, filed on May 8, 2014.

(51) Int. Cl.
*F23R 3/12* (2006.01)
*F23C 99/00* (2006.01)
*F23R 3/14* (2006.01)
*F02C 7/264* (2006.01)

(52) U.S. Cl.
CPC .............. *F23R 3/12* (2013.01); *F23R 3/14* (2013.01); *F23C 2900/99005* (2013.01); *F23D 2207/00* (2013.01); *F23D 2209/20* (2013.01); *F23R 2900/00008* (2013.01); *F23R 2900/00009* (2013.01)

(58) Field of Classification Search
CPC .. F23R 3/343; F23R 3/346; F23R 3/36; F23R 2900/00008; F23R 2900/00009; F02C 7/264; F02C 7/266; F23C 99/001; F23C 2900/99005; F23D 2207/00
See application file for complete search history.

(56) References Cited

U.S. PATENT DOCUMENTS

| | | |
|---|---|---|
| 2002/0092302 A1 | 7/2002 | Johnson et al. |
| 2005/0044854 A1 | 3/2005 | Cazalens et al. |
| 2008/0033066 A1 | 2/2008 | Haynes |
| 2009/0071158 A1* | 3/2009 | Cazalens ............... F23R 3/286 60/737 |
| 2009/0165436 A1 | 7/2009 | Herbon et al. |
| 2011/0126548 A1 | 6/2011 | Hammer et al. |
| 2016/0305393 A1* | 10/2016 | Idicheria ............... H01T 13/20 |

* cited by examiner

METHOD AND APPARATUS FOR ASSISTING WITH THE COMBUSTION OF FUEL BY USING A PLASMA GENERATOR WITHIN A FUEL NOZZLE

RELATED APPLICATION

This application is a Continuation of U.S. patent application Ser. No. 14/707,427, filed 8 May 2015, which claims priority from U.S. Provisional Application No. 61/990,314, filed 8 May 2014, the subject matter of all of which is incorporated herein by reference in its entirety.

TECHNICAL FIELD

This disclosure relates to an apparatus and method for assisting with the combustion of fuel and, more particularly, to applying a plasma field to an air-fuel mixture to at least partially ionize and/or dissociate the air-fuel mixture.

BACKGROUND

It is well known that plasma is an electronically exited state of matter in which the electrons from individual atoms are stripped via electrical interactions with the energy source and by collisions with other energized particles. Plasmas are useful at speeding up reactions by transferring the plasma's energy into the vibration translational or rotational energy of reactants. Plasma assisted reactions usually include reforming the reactants. Reactants are reformed by the breaking of bonds and the production of active radicals.

The production of active radicals is the mechanism by which combustion propagates. This process occurs at the expense of energy and time. It therefore stands to reason that eliminating or bypassing the discrete reaction steps could increase the rate of the reaction. This may be achieved through a plasma-assisted reaction.

Moreover, in modern turbofan engines the velocity of the air at the entrance of the combustion chamber is around 150 meters per second depending on the thrust rating of the engine and the atmospheric conditions. The speed of the velocity air entering the combustion chamber is of concern because this ~150 m/s flow velocity is much higher than the flame speed of a kerosene air flame, and may make it difficult to sustain combustion. For combustion to occur in a sustainable manner, engine designers generally will reduce both the velocity and pressure of the incoming air before attempting to initiate a combustion reaction with that air. To reduce the velocity and/or pressure of the combustion air, the combustion chamber often will be provided with geometries, which impede the airflow and force it to reduce its velocity. Examples of these geometries are swirl vanes and dilution holes, as well as the shape of the combustion chamber itself. The chamber can be shaped to create an eddy—an area of lower pressure in which combustion is permitted to occur—albeit at the expense of a pressure drop across the combustion chamber. According to basic thermodynamics, this pressure drop in the combustion chamber will reduce efficiency of combustion. As a result of this compromise in even the most efficient jet engines, roughly 10% of the input fuel is left un-burnt.

Moreover, the high temperatures used in the efficient operation of a jet engine also promote the oxidation of atmospheric nitrogen, creating NOx emissions. It has been shown that a way to decrease NOx emissions while simultaneously decreasing fuel burn is to minimize the fuel to air ratio in the combustor. Lean Direct Injection (LDI) and Lean Premixed Prevaporized (LPP) combustion systems deliver these air-fuel mixtures. However, the challenge with lean combustion in jet engines is that lean flames are unstable and are subject to blow off, extinction, and thermo-acoustic oscillations, which can cause severe mechanical damage to the engine.

SUMMARY

In an aspect, an apparatus for assisting with the combustion of fuel is described. A swirler assembly is provided, the swirler assembly having at least one swirler assembly inlet and at least one swirler assembly outlet longitudinally separated from the at least one swirler assembly inlet by a swirler body defining a swirler assembly inner wall. A fuel nozzle is provided. The fuel nozzle has a fuel nozzle mixing chamber, a fuel nozzle air inlet, and a fuel nozzle air outlet. The fuel nozzle mixing chamber is in fluid communication with both a fuel nozzle fuel reservoir and the fuel nozzle air inlet. The fuel nozzle air inlet allows air to flow into the fuel nozzle. Fuel from the fuel nozzle fuel reservoir is directed into the fuel nozzle mixing chamber and, inside the fuel nozzle mixing chamber, the fuel combines with air therein to form a fuel-air mixture. At least one plasma generator is located at least partially within the fuel nozzle. The plasma generator at least partially ionizes and/or dissociates the fuel-air mixture to generate an at least one of an at least partially ionized air-fuel mixture and an at least partially dissociated air-fuel mixture ("at least partially I/D air-fuel mixture") via a plasma generator discharge. A combustion chamber has a combustion chamber inlet in fluid communication with the swirler assembly outlet. The combustion chamber has a combustion chamber outlet. The combustion chamber inlet and outlet are longitudinally separated by a combustion chamber internal volume including an R/R zone, a main flame, and a pilot flame. The combustion chamber inlet admits the at least partially I/D air-fuel mixture from the plasma generator into the combustion chamber internal volume. Combustion air enters the swirler assembly inlet, flows through the swirler body, and exits the swirler body through the swirler assembly outlet. The combustion air flows from the swirler assembly outlet into the combustion chamber internal volume through the combustion chamber inlet. Combustion of the at least partially I/D air-fuel mixture with the combustion air occurs at least partially within the combustion chamber internal volume to responsively produce products. The products exit the combustion chamber internal volume through the combustion chamber outlet.

In an aspect, an apparatus for assisting with the combustion of fuel is described. A fuel nozzle has a fuel nozzle mixing chamber, a fuel nozzle air inlet, and a fuel nozzle air outlet. The fuel nozzle mixing chamber is in fluid communication with both a fuel nozzle fuel reservoir and the fuel nozzle air inlet. The fuel nozzle air inlet allows combustion air to flow into the fuel nozzle. Fuel from the fuel nozzle fuel reservoir is directed into the fuel nozzle mixing chamber and, inside the fuel nozzle mixing chamber, the fuel combines with air therein to form a fuel-air mixture. At least one plasma generator is located at least partially within the fuel nozzle. The plasma generator at least partially ionizes and/or dissociates the fuel-air mixture to generate at least one of an at least partially ionized air-fuel mixture and an at least partially dissociated air-fuel mixture ("at least partially I/D air-fuel mixture"). A combustion chamber has a combustion chamber inlet in fluid communication with the fuel nozzle air outlet. The combustion chamber has a combustion chamber outlet. The combustion chamber inlet and outlet are longitudinally separated by a combustion chamber internal volume including an R/R zone, a main flame, and a pilot flame. The combustion chamber inlet admits the at least partially I/D air-fuel mixture from the plasma generator into the combustion chamber internal volume. Combustion of the at least partially I/D air-fuel mixture with the combustion air occurs at least partially within the combustion chamber internal volume to responsively produce products. The products exit the combustion chamber internal volume through the combustion chamber outlet.

In an aspect, a method for assisting with the combustion of fuel is described. An apparatus is provided. The apparatus includes a fuel nozzle, having a fuel nozzle mixing chamber, a fuel nozzle air inlet, and a fuel nozzle air outlet. The fuel nozzle mixing chamber is in fluid communication with both a fuel nozzle fuel reservoir and the fuel nozzle air inlet. The fuel nozzle air inlet allows air to flow into the fuel. At least one plasma generator is located at least partially within the fuel nozzle. A combustion chamber has a combustion chamber inlet in fluid communication with the swirler assembly outlet. The combustion chamber has a combustion chamber outlet. The combustion chamber inlet and outlet are longitudinally separated by a combustion chamber internal volume. The combustion chamber internal volume includes an R/R zone, a main flame, and a pilot flame. Fuel is provided to the fuel nozzle mixing chamber from the fuel nozzle fuel reservoir. A fuel-air mixture is created by combining fuel and air within the fuel nozzle mixing chamber. A plasma field is created with a plasma generator located at least partially within the fuel nozzle. With the plasma generator, at least one of an at least partially ionized air-fuel mixture and an at least partially dissociated air-fuel mixture ("at least partially I/D air-fuel mixture") is created from at least a portion of the fuel-air mixture. At least a portion of the fuel-air mixture is combusted in the combustion chamber with the plasma field generated from the at least partially I/D air-fuel mixture to produce products.

BRIEF DESCRIPTION OF THE DRAWINGS

For a better understanding, reference may be made to the accompanying drawings, in which.

DESCRIPTION OF ASPECTS OF THE DISCLOSURE

The invention comprises, consists of, or consists essentially of the following features, in any combination.

Figure 1:
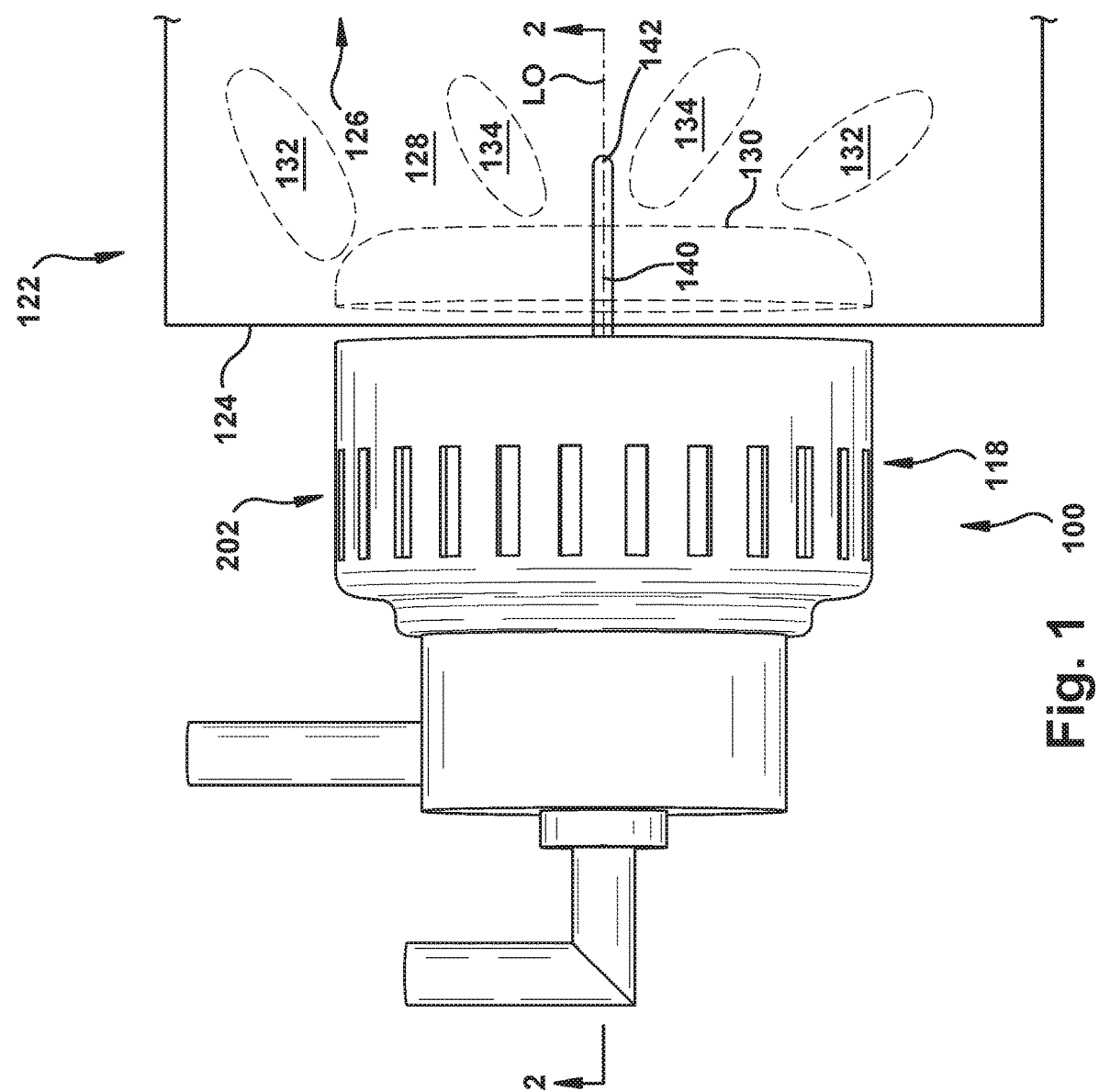
FIG. 1 is a schematic side view of an apparatus according to the present invention.
Figure 2:
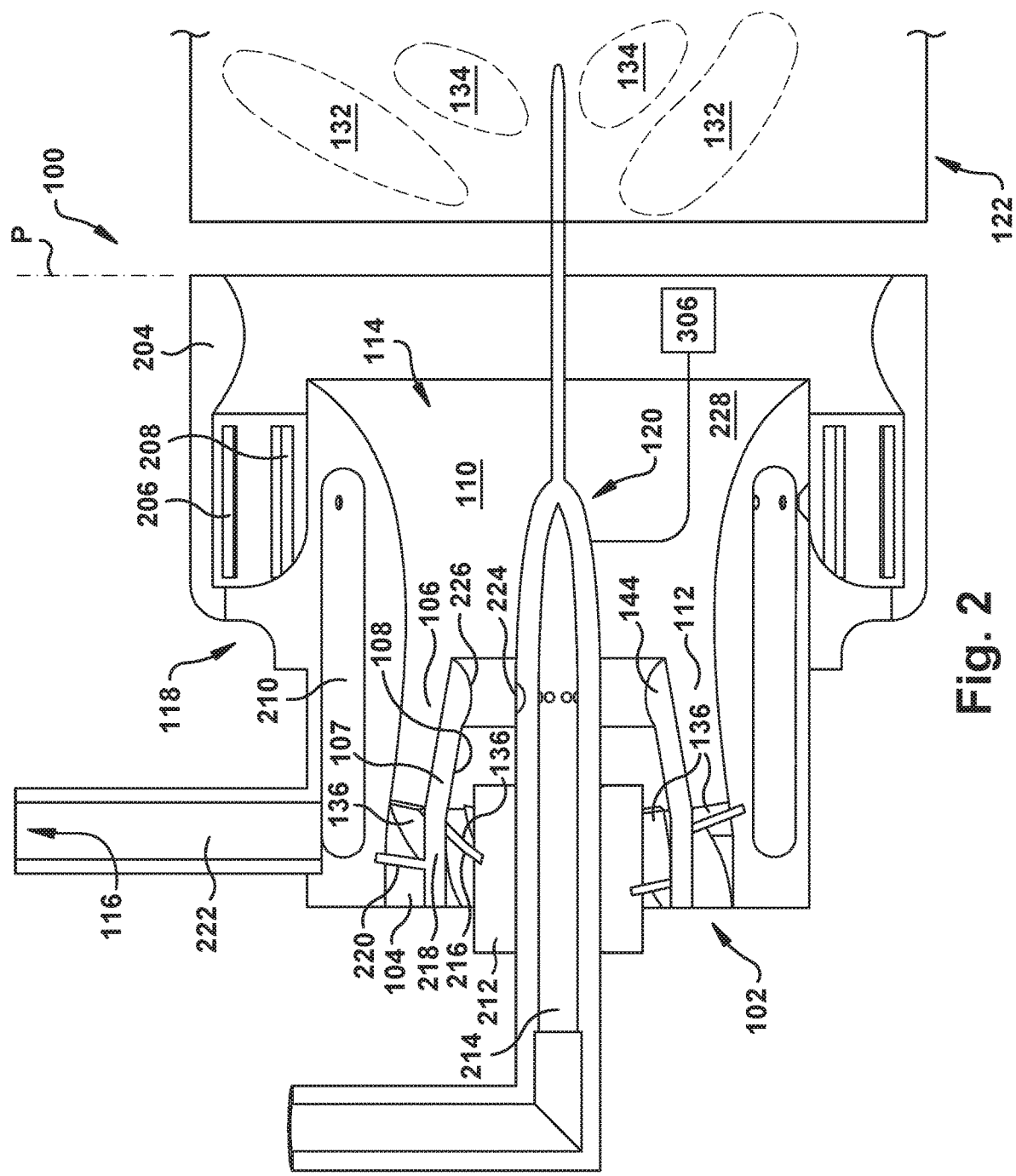
FIG. 2 is a cross-sectional view taken along line 2-2 of FIG. 1.

FIGS. 1-2 depict an apparatus 100 for assisting with the combustion of fuel. The description herein presumes that the apparatus 100 is being used as part of a jet engine, but the apparatus 100 may also or instead be used in a gas turbine or any other suitable use application.

The apparatus 100 may include a swirler assembly 102, which includes at least one swirler assembly inlet 104 longitudinally separated from at least one swirler assembly outlet 106 by a swirler body 107 defining a swirler body inner wall 108. The term "longitudinal" is used herein to reference a direction substantially parallel to longitudinal axis "LO"—e.g., the left-right direction in the orientation of FIGS. 1-2.

The swirler assembly 102, when present, assists combustion air to enter into the apparatus 100 and attain a desired flow direction. The swirler assembly 102 accepts combustion air from an ambient source through a swirler assembly inlet 104. The combustion air then travels through the swirler body 107 and exits the swirler assembly 102 through the swirler assembly outlet 106.

The swirler assembly 102, when present, includes at least one swirler vane 136 for imparting a helical direction to the combustion air. At least one swirler vane 136 may extend in a direction that is at least one of laterally inward and laterally outward from the swirler assembly inner wall 108 (whether or not the "fin"-shaped structure forming the swirler vane 136 is itself cantilevered directly from the swirler assembly inner wall 108 or from another structure of the swirler assembly 102). The term "lateral" is used herein to indicate a direction in a plane substantially perpendicular to the longitudinal direction LO—i.e., into and out of the plane of the paper in the orientation of FIGS. 1-2. The swirler vane(s) 136, when present, may serve to help impart a helical aspect (A.K.A., "angular momentum") to the flow direction of the combustion air through the swirler body 107 and from the swirler assembly outlet 106.

It is contemplated that any provided swirler assembly 102 may be one or both of an axial swirler assembly 102 and a radial swirler assembly 102. It is further contemplated that the apparatus 100 may also include more than one swirler assembly 102. The orientation of the swirler assemblies 102 may be configured to provide any desired directional change upon the flow path of the combustion air.

Combustion air may pass through multiple swirler assemblies 102. For example, the combustion air could pass through a first swirler assembly 102 and then from there into a second swirler assembly (not shown) and/or through two concentric swirler assemblies as to impart either a co-rotating or counter-helical aspect to the flow, as desired.

The swirler assembly 102 may include several swirler vanes 136 arranged in any suitable pattern or patterns, such as, but not limited to, a concentric circle pattern. Furthermore, the swirler vanes 136 of a single swirler assembly 102 may be arranged in differing patterns. For example, the swirler vanes 136 may be placed at different angles from one another with respect to the longitudinal axis in order to modify the helical direction of the combustion air in a desired manner. When multiple swirler vanes 136 are used, the swirler assembly 102 may also include an annular flow separator 144. The annular flow separator 144, when present, may aid in changing the path of the combustion air in a desired manner.

When the apparatus 100 does not include a swirler assembly 102, the combustion may be stabilized via aerodynamic swirl generated in any suitable manner, such as, but not limited to, tangential admission of air to some structure of the jet engine.

The apparatus 100 further includes a fuel nozzle 118. The fuel nozzle 118 contains a fuel nozzle mixing chamber 110. The fuel nozzle mixing chamber 110 contains a fuel nozzle air inlet 112 and a fuel nozzle air outlet 114. The fuel nozzle mixing chamber 110 is in fluid communication with both the fuel nozzle air inlet 112 and a fuel nozzle fuel reservoir 116, from which fuel, which may be any suitable liquid and/or gaseous fuel (e.g., methane, Jet-A, or the like), is directed into the fuel nozzle mixing chamber 110. The fuel nozzle air inlet 112 allows air (e.g., the swirling or helically-directed air from the swirler assembly outlet 106, or any other air, swirling or not, from any other suitable source) to flow into the fuel nozzle 118. A fuel-air mixture then forms in the fuel nozzle mixing chamber 110 as the fuel is dispersed into the helically flowing combustion air which was received into the fuel nozzle mixing chamber 110 from the swirler assembly 102.

Combustion air may enter the fuel nozzle mixing chamber 110 at the same or different times as does the fuel. Depending upon the fuel contained within the fuel nozzle fuel reservoir 116, the apparatus 100 may take on different geometries for desired performance, and an apparatus 100 having a particular configuration for a desired result may be provided by one of ordinary skill in the art of fluid dynamics and gas turbine combustor design. Fuel and air are mixed within the fuel nozzle mixing chamber 110 at least in part as a result of the helical or swirling flow direction of the combustion air that enters the fuel nozzle mixing chamber 110. When the fuel and air are mixed, a substantially homogenous air-fuel mixture is created.

Figure 3:
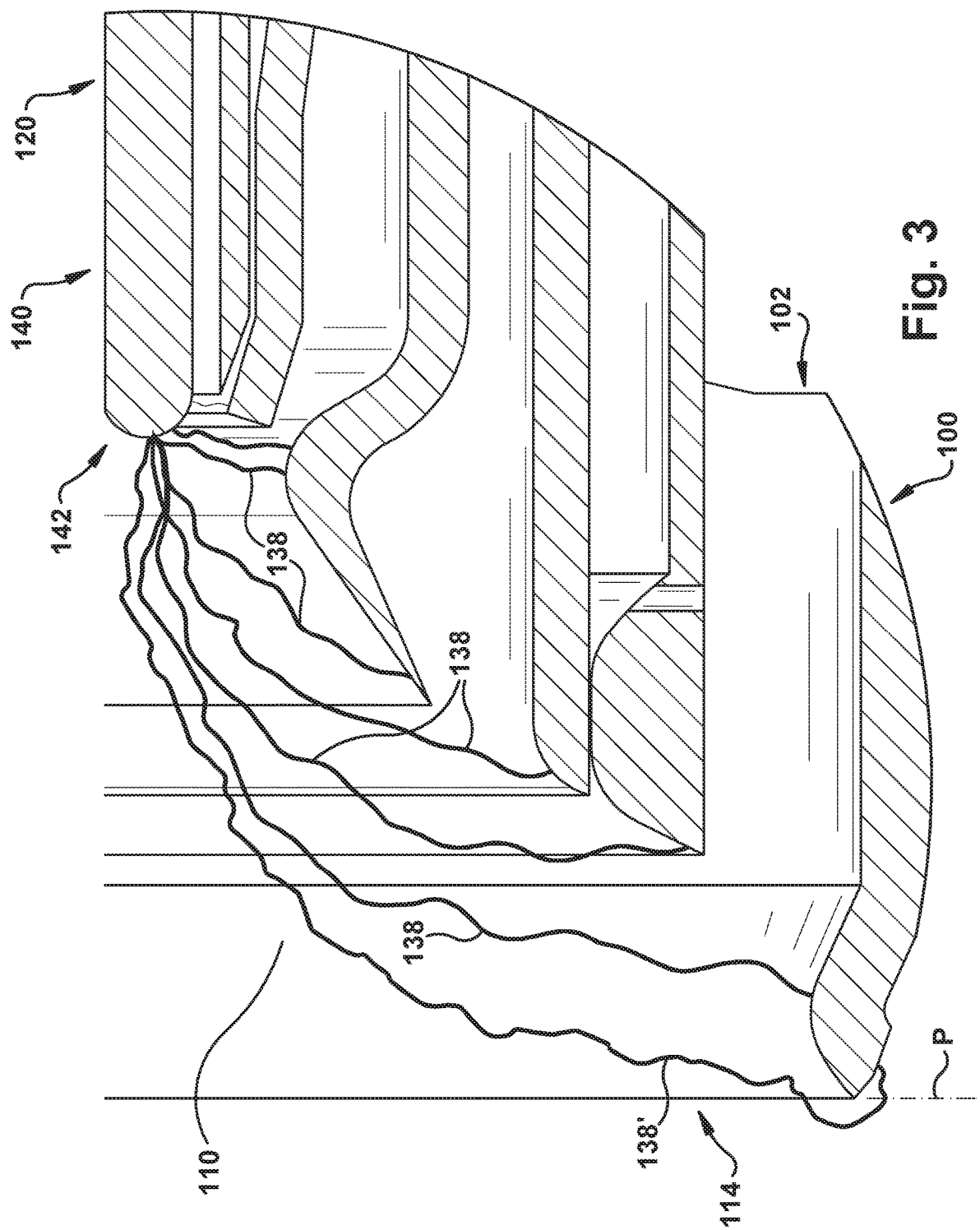
FIG. 3 is a schematic partial sectional detail view of a second configuration of the apparatus of FIG. 1.

Also located at least partially within the fuel nozzle 118 is a plasma generator 120. The plasma generator 120, in use, creates a plasma discharge (shown schematically as plasma generator discharge 138 throughout the Figures) that is in electrical communication with at least a portion of the fuel nozzle 118, as shown in FIG. 3. The creation of the plasma generator discharge 138 at or near the air-fuel mixture partially ionizes and/or dissociates the fuel-air mixture to create a partially ionized and/or dissociated air-fuel mixture (hereafter referenced as an "at least partially I/D air-fuel mixture"), as will be discussed below in more detail.

Since a flame is, after all, a chemical reaction, the speed of the reaction can be described in terms of the kinetics of the exothermic oxidation of the fuel (e.g., propane). According to the kinetic theory of reactions, increasing the temperature of a system increases the average kinetic energy of the individual molecules. An increase in the kinetic energy of the molecules in turn yields more effective collisions. Therefore, increasing the temperature of a chemical reaction will increase the rate at which that reaction proceeds. The high temperatures of plasma, as well as the high-energy particles created, may be able to aid with enhancing reaction speed to reduce the amount of un-burnt fuel in an engine and solve other combustion challenges such as lean blow off extension.

Branch chain reactions with active radicals may be the mechanism for flame propagation. Therefore, for plasma to affect a flame, the discharge should have a high degree of volumetric excitation—i.e., a large volume of gas should be excited by the plasma, and the radicals/excited species generated by the plasma should be able to make it into an appropriate part of the combustion engine (e.g., a reaction zone, a recirculation zone, an R/R zone, a combustion chamber, any combination thereof, or any other suitable area) before they are quenched. The injection of plasma into a combustion engine could increase the flame speed of the fuel and air mixture thereby decreasing the residence time needed for complete combustion. Furthermore, since plasma has the potential to increase flame speed, higher molecular weight fuels with greater energy densities could be used. Usually, higher molecular weight fuels are not used due to a penalty in the rate of combustion. Plasma-assisted reactions could substantially reduce the combustion rate penalty associated with higher molecular weight fuels as well as provide for greater flexibility in combusting fuels with varying Wobbe numbers.

Also, heavier fuels generally deflagrate slower than lighter fuels because their decomposition is highly endothermic. Since plasma has the ability to influence the kinetics of a reaction and shorten ignition time, plasma can increase flammability limits, thereby allowing mixtures with equivalence values $\phi<1$ (i.e., lean mixtures in which there is less fuel present than the stoichiometric ideal) to stabilize. This translates into fuel savings, decreased emissions, and a decrease in operating costs for an engine using such plasma-assisted combustion techniques.

Furthermore, since plasma decreases ignition time, the use of plasma in an engine increases the probability of a successful relight. If combustion ever becomes unstable and extinguishes in a gas turbine, plasma could promote the ignition and stabilization of the new flame, allowing for successful relights or preventing the blow off event from occurring altogether. Moreover, previous research has shown that singlet oxygen molecules and activated species of nitrogen, as well as chain branching and initiation, contribute significantly to the effects of plasma-assisted combustion. Therefore, the fuel-air mixture should be treated and activated homogenously.

This homogeneous treatment is achieved in the apparatus 100 through creating a substantially homogenous air-fuel mixture within the fuel nozzle mixing chamber 110 and generating plasma at or near the homogenous air-fuel mixture. Here, the plasma may at least partially ionize and/or at least partially dissociate the air-fuel mixture. The process of ionization is achieved when an electric field excites electrons within the fuel molecule so much that the excitation results in either the gain or loss of an electron by/from that molecule. Further ionization may proceed via further excitation, direct electron impact, third body collisions, or other pathways. Dissociation is achieved when the energy provided by plasma causes a partial split fuel molecule. This split may result in the separation of smaller atoms, like hydrogen, and the creation of free radicals or other activated states. The above described process, or portions thereof, results in the creation of an at least partially I/D air-fuel mixture using the plasma generator 120 and other components of the apparatus 100.

Furthermore, the plasma generator 120 may be any device capable of generating plasma. These devices include, but are not limited to, a nanosecond pulsed plasma generator, a dielectric barrier discharge plasma generator, a radiofrequency discharge plasma generator, a laser plasma generator, a microwave plasma generator, a gliding arc plasma generator, or any combination thereof. The apparatus 100 may include multiple plasma generators 120, which may be the same or different types of plasma generator 120 and may operate simultaneously or in any desired sequence.

The plasma generator discharge 138 may be at least one of a gliding arc discharge, a streamer discharge, a dielectric barrier discharge, an RF discharge, and a nanosecond pulsed discharge. It is contemplated that the apparatus 100, at any given time, may employ more than one type of plasma generator discharge 138.

The apparatus 100 also includes a combustion chamber, shown schematically at 122 in FIG. 1. The combustion chamber 122 contains a combustion chamber inlet 124 in fluid communication with at least one of the fuel nozzle air outlet 114 and the swirler assembly outlet 106. The combustion chamber inlet 124 admits the at least partially I/D air-fuel mixture from the plasma generator 120 into a combustion chamber internal volume 128. The combustion chamber 122 is further defined by a combustion chamber outlet 126 which is longitudinally separated from the combustion chamber inlet 124 by the combustion chamber internal volume 128. The combustion chamber outlet 126 allows the products from reactions that take place within the combustion chamber 122 to exit the combustion chamber 122. Stated differently, combustion of the at least partially I/D air-fuel mixture with the combustion air may occur at least partially within the combustion chamber internal volume 128 to responsively produce products, and the products exit the combustion chamber internal volume 128 through the combustion chamber outlet 126. The combustion chamber inlet 124 and combustion chamber outlet 126 at least partially define the combustion chamber internal volume 128.

The combustion chamber internal volume 128 contains an R/R zone 130. The term "R/R zone" is used herein to reference a volume within the combustion chamber 122, just downstream from the plasma generator discharge 138, in which reactions and/or recirculation are taking place. The term "reaction zone" is generally used to indicate the entire volume within which reactions are taking place. The term "recirculation zone" is generally used in the art to describe a pattern of flow which reverses and brings combustion products back to the flame; the recirculation zone is located downstream of the plasma disk, and is substantially inside the reaction zone.

The combustion chamber internal volume 128 may further include a main flame and a pilot flame, shown schematically at 132 and 134, respectively. The R/R zone 130 allows combustion products to proceed toward at least one of the main flame 132 and the pilot flame 134 thereby providing stabilization. The R/R zone 130 will be now be briefly discussed.

At least a portion of the at least partially I/D air-fuel mixture enters the combustion chamber 122 by first passing into R/R zone 130. Within this R/R zone 130, fuel and air are further mixed to provide a more homogenous solution. This R/R zone 130 may also be in direct fluid communication with the fuel reservoir 116. The additional fuel provided to the air-fuel mixture in the R/R zone 130 may or may not become partially ionized. The plasma generator 120 may further ionize and/or dissociate the air-fuel mixture by creating a plasma generator discharge 138 that extends into the combustion chamber 122 such that radicals and activated particles are generated sufficiently close to the R/R zone 130 so as to provide desired flame stabilization. Although the fuel and the air may continue to premix after they leave the fuel nozzle 118 (including the fuel nozzle mixing chamber 110), the R/R zone 130 will tend to bring combustion products back to the base of at least one of the main flame 132 and the pilot flame 134, providing stabilization in an area within a desired proximity to the plasma generator discharge 138.

The fuel that entered the R/R zone 130 but did not enter the fuel nozzle mixing chamber 110 may become ionized within the combustion chamber 122. In other words, the fuel and air are premixed, and this air-fuel mixture flows into the combustion chamber 122 where combustion starts at the beginning of the flame front (the start of the R/R zone 130). Plasma may be used to create the at least partially I/D air-fuel mixture anytime between the premixing and the R/R zone 130. The R/R zone 130 brings hot combustion products (mainly from the pilot flame 134) back to the base of the main flame 132 to provide stabilization. The R/R zone 130 is created due to forces imparted on the fluids inside the combustion chamber 122 by aerodynamic swirl, the pilot flame 134, the main flame 134 and the at least partially I/D air-fuel mixture itself Sending the at least partially I/D air-fuel mixture towards the main flame 132 and/or pilot flame 134, whether or not an R/R zone 130 is used, may help to stabilize the main flame and pilot flame through the previously discussed kinetics.

The combustion chamber internal volume 128 further serves as the location for combustion reactions. These combustion reactions are facilitated by the at least partially I/D air-fuel mixture coming into contact with at least one of the main flame 132 and pilot flame 134. The combustion of the at least partially I/D air-fuel mixture then produces reaction products. These products are then directed to exit the combustion chamber 122 through the combustion chamber outlet 126, producing the desired thrust forces from the engine.

The plasma generator 120 may include an electrode 140 extending substantially longitudinally from a remaining portion of the plasma generator to terminate, spaced apart from the remaining portion of the plasma generator, at an electrode free end 142. The shape of the electrode free end 142 may vary for different use environments of the apparatus 100. For instance, the electrode 140 may have a rounded, pointed, or blunt electrode free end 142 capable of generating various types of plasma generator discharges 138 as desired by one of ordinary skill in the art to create an electric field having a desired strength, shape, or other property for a particular use environment. Similarly, the length of the electrode's 140 protrusion from the remaining portion of the plasma generator may differ for different use environments of the apparatus 100.

For example, as shown in FIG. 3, the electrode 140 may be configured such that the entire length of the electrode 140, including the electrode free end 142, is wholly located within the fuel nozzle mixing chamber 110.

Figure 4:
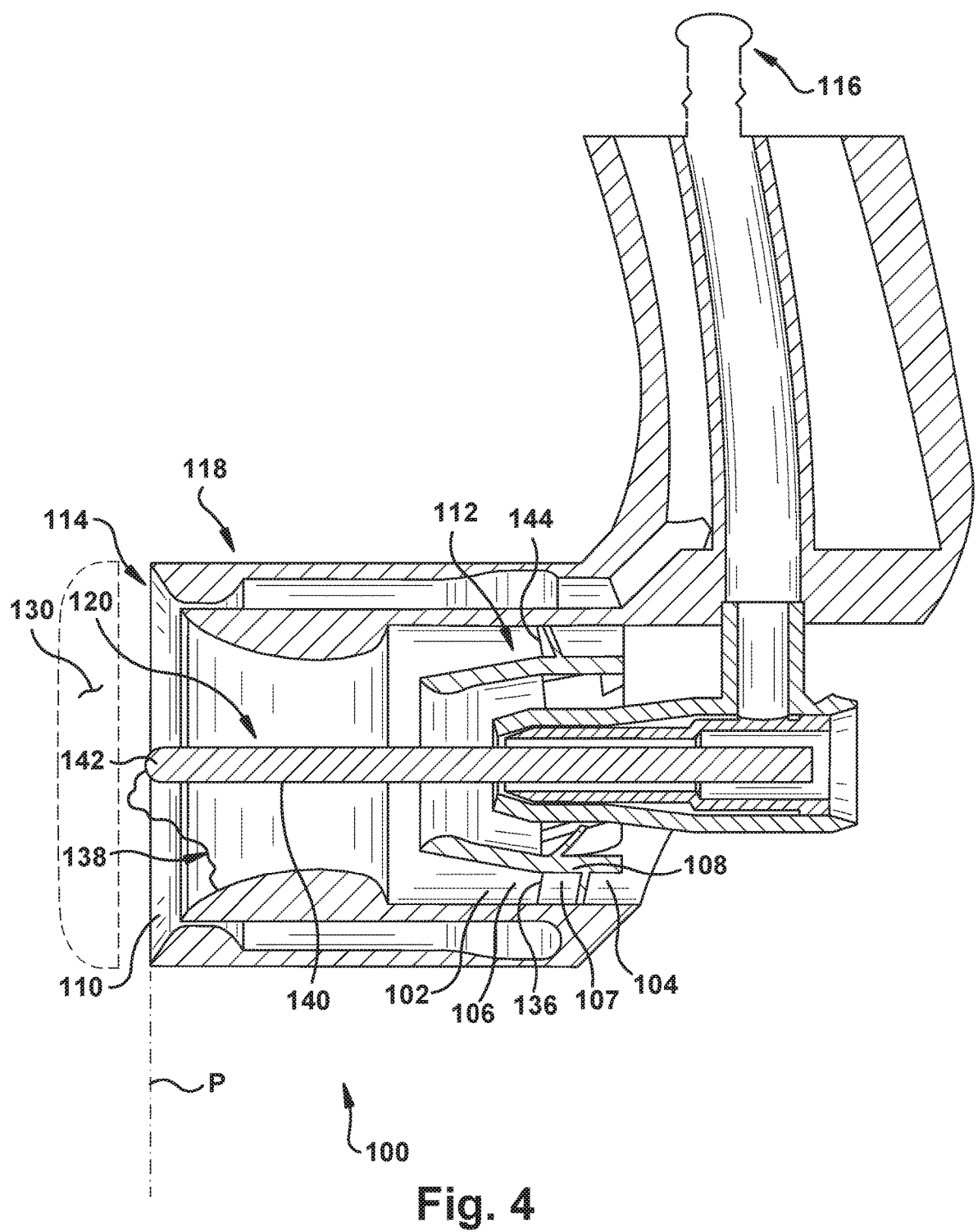
FIG. 4 is a cross-sectional view taken along line 4-4 of FIG. 5.

As another example, and as shown in FIG. 4, the electrode 140 is shown in a configuration wherein the electrode free end 142 is substantially located with the lateral plane P, which is the lateral plane substantially formed by the outermost perimeter/rim of the fuel nozzle air outlet 114.

As yet another example, and as shown in FIG. 2, the electrode 140 may extend longitudinally from a remaining portion of the plasma generator 120 sufficiently far to interpose the lateral plane P (substantially formed by the outermost perimeter/rim of the fuel nozzle air outlet 114) longitudinally between the fuel nozzle mixing chamber 110 and the electrode free end 142.

One of ordinary skill in the art can configure the electrode 140 and other components of the apparatus 100 to achieve a desired result for a particular use environment of the apparatus 100. For example, it may be desirable for the plasma generator 120 and/or the plasma generator discharge 138 to extend at least one of laterally and longitudinally outward from the electrode free end 142 into the combustion chamber 122. In this example, then, it may be desirable to have the extended-length electrode 140 shown in FIGS. 1-2. Regardless of the particular design of the electrode 140 or other portions of the plasma generator 120, however, the plasma generator discharge 138 is a plasma field that is in electrical communication with the electrode free end 142 and some other portion of the apparatus 100. For example, as shown in FIG. 3, the plasma generator discharge 138 is a plasma field that is in electrical communication with the electrode free end 142 and at least some surface of the fuel nozzle 118, such as, but not limited to, the fuel nozzle air outlet 114. The plasma generator discharge 138 of the apparatus 100 is designed to electrically "bridge", in an at least partially lateral direction, a lateral distance or gap between the electrode 140 and at least one of the structures of the apparatus substantially concentrically surrounding the electrode 140 in order to at least partially ionize and/or dissociate a fuel-air mixture flowing, optionally with an at least partially helical flow direction, within that gap. This "bridging" by the plasma generator discharge 138 may assist with combustion reactions of the fuel as previously discussed.

Figure 5:
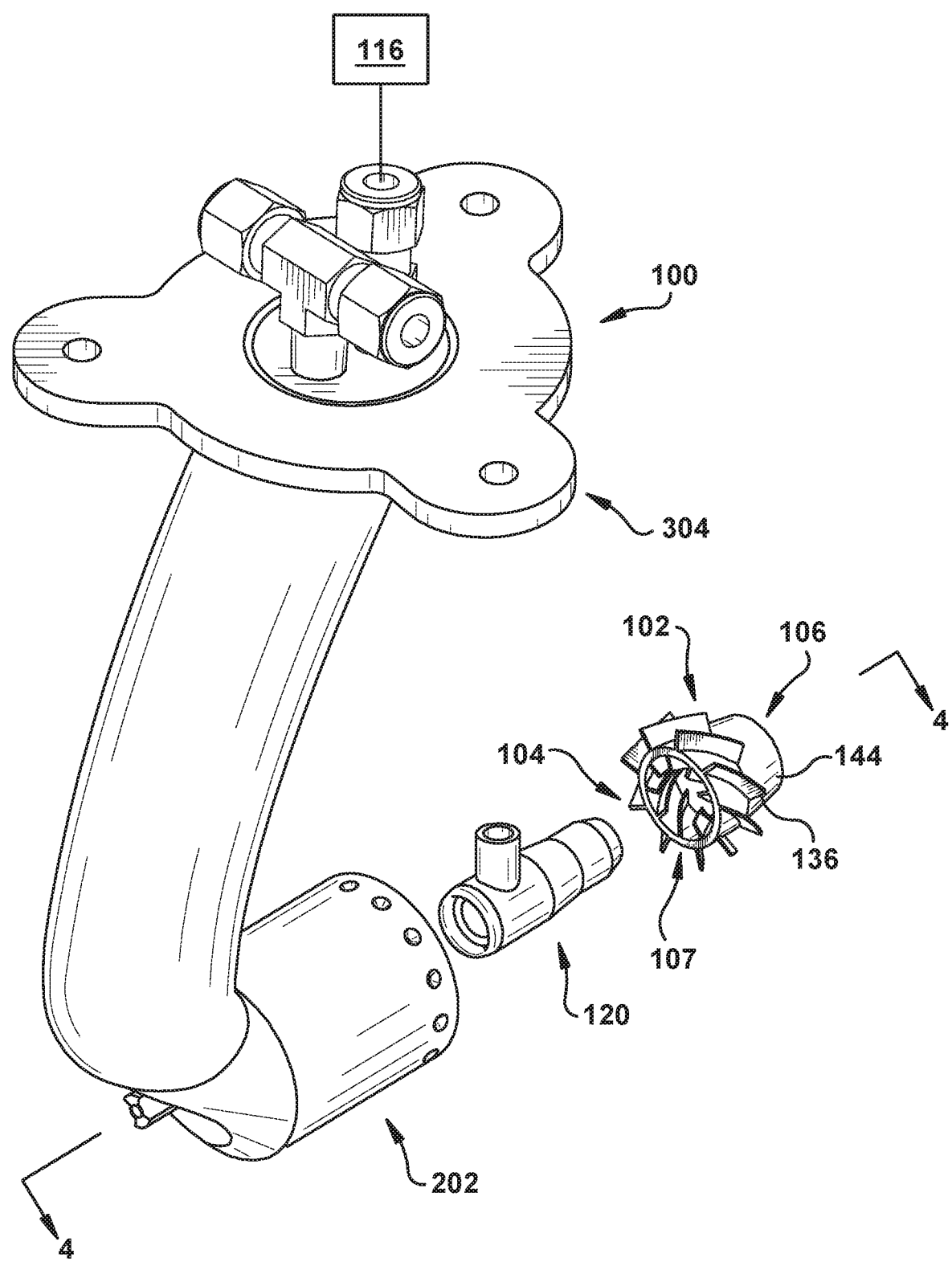
FIG. 5 is an schematic exploded perspective view of the apparatus of FIG. 1 in a third configuration.
Figure 6:
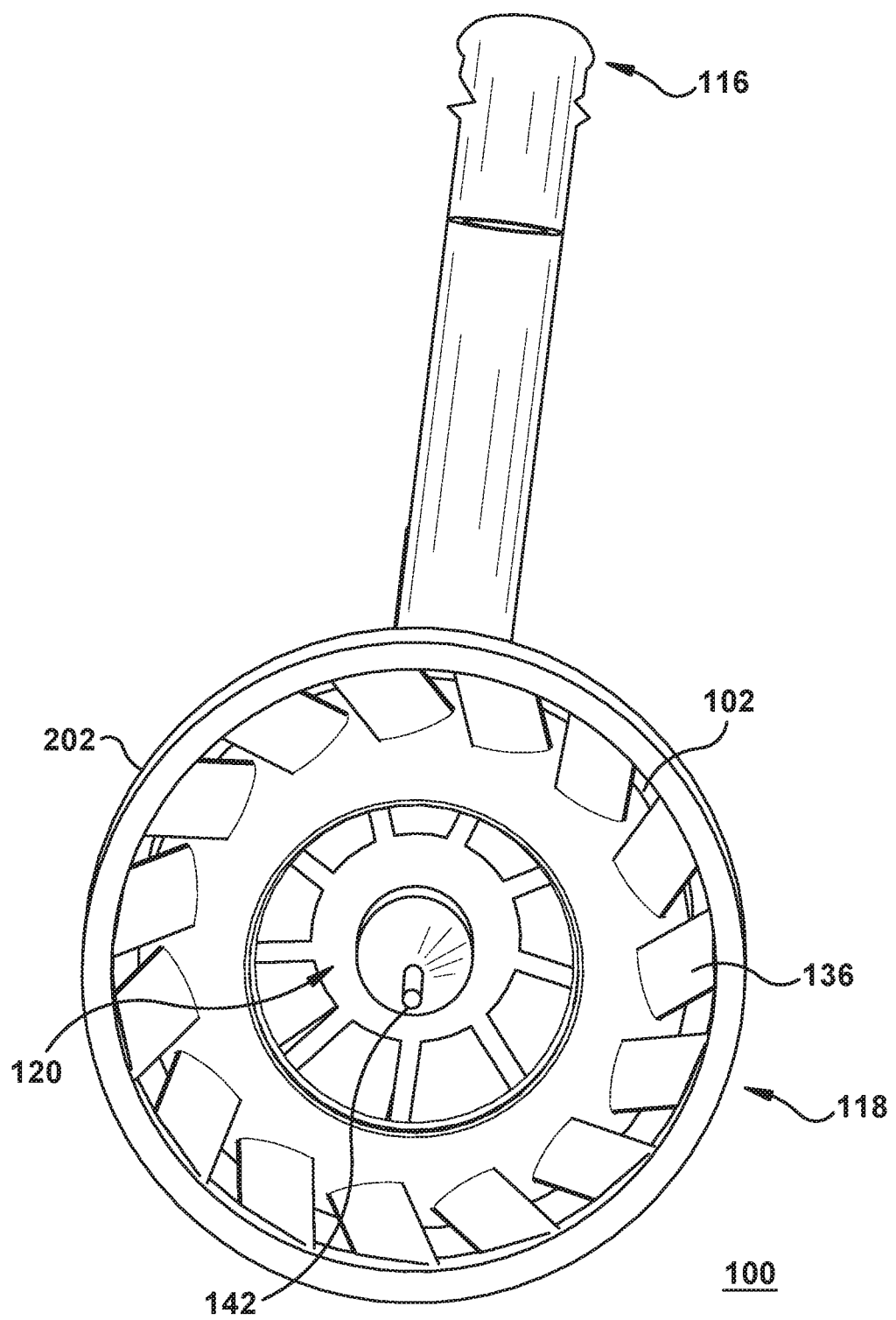
FIG. 6 is a schematic front view of the apparatus of FIG. 1.

Furthermore, the apparatus 100 as shown in FIGS. 5-6 includes a fuel nozzle mixer housing 202, which may at least partially laterally surround the fuel nozzle 118. The fuel nozzle mixer housing 202 may be in fluid communication with the fuel nozzle fuel reservoir 116. When the fuel nozzle mixer housing 202 is in fluid communication with the fuel nozzle fuel reservoir 116, fuel will be distributed into the fuel nozzle mixer housing 202, where the fuel may be atomized and partially premixed with the air. For example, the fuel nozzle mixer housing 202 may serve as a premixing zone for the main fuel flow from which the main flame 132 is produced. Accordingly, the fuel nozzle 118 may include radial holes which spray fuel into the fuel nozzle mixer housing 202, wherein the fuel is atomized and at least partially premixed with swirling air from other portions of the apparatus 100, such as the swirler assembly 102.

The fuel nozzle mixer housing 202 may also admit combustion air from an ambient space, or another source, such as from the compressor of the jet engine. Particularly in the latter, the compressor supplies relatively high pressure air, part of which flows through the fuel nozzle 118 (serving primarily as the air supply for the pilot flame 134), and part of which flows around the sides of the apparatus 100 and then enters the apparatus 100 through the fuel nozzle mixer housing 202 (optionally being directed into a helical flow path en route), where the air is premixed with fuel.

Finally, the fuel nozzle mixer housing 202 may also be in fluid communication with the combustion chamber 122. As such, the fuel nozzle mixer housing 202 may also be in fluid communication with the R/R zone 130, which is within the combustion chamber 122.

Therefore, the fuel nozzle mixer housing 202, when present, may assist with further mixing air and fuel that enters into the combustion chamber 122. (The air and fuel will generally mix substantially prior to contact with the plasma generator discharge 138, but may continue to mix during or even after contact with the plasma within the apparatus 100, depending upon factors such as the location of the plasma generator discharge 138.) The fuel-air mixture will combust in the combustion chamber 122, creating at least one of the main flame 132 and pilot flame 134. At least one of the pilot flame 134 and the main flame 132 may be enhanced by the plasma generator discharge 138 generated where the discharge is disposed after there has been fuel-air premixing.

It is contemplated that the fuel-air mixture created by the fuel nozzle mixer housing 202 may become at least partially ionized and/or dissociated in any one or more of several ways. One way the air-fuel mixture may become at least partially ionized and/or dissociated is by directly entering into the combustion chamber 122 wherein the fuel-air mixture from the fuel nozzle mixer housing 202 is in close proximity to the plasma generator discharge 138. The close proximity will result in an at least partially I/D air-fuel mixture sufficient for the formation of an ignition kernel or the stabilization of at least one of the main flame 132 and the pilot flame 134. The fuel and air may at least partially premix in the fuel nozzle mixing chamber 110 as well as in the fuel nozzle mixer housing 202. This mixture will then be in close proximity to the plasma generator discharge 138. This close proximity results in an at least partially I/D air-fuel mixture when the fuel-air mixture encounters the plasma generator discharge 138. Due to aerodynamic forces, the fuel and air may continue to mix until the base of the flame when they are combusted. The plasma discharge may also be disposed into the R/R zone 130 to aid stabilization and in situ production of radicals and I/D air-fuel mixture FIG. 3 depicts several example paths for plasma generator discharges 138. Here, one particular plasma generator discharge path is being shown at 138' as being in electrical communication with an outer surface of the fuel nozzle air outlet 114. However, it is contemplated that the plasma generator discharge 138 may also or instead be in electrical communication with some surface of the fuel nozzle mixing chamber 110 and/or the fuel nozzle mixer housing 202. These are just examples of multiple potential paths that the plasma generator discharge 138 may take, singly or in combination. The plasma generator discharge may be in electrical communication with any location upon the fuel nozzle 118 surface and the plasma generator discharge 138 may elongate as it is pushed downstream by aerodynamic forces.

No matter the path chosen by the plasma generator discharge 138, though, the encounter between the plasma generator discharge 138 and the fuel-air mixture will result in an at least partially I/D air-fuel mixture. For the sake of the below description, though, the plasma generator 120 will be presumed to be a gliding arc type plasma generator 120. That is, the apparatus 100 at least partially ionizes and/or dissociates the fuel-air mixture using the plasma field. As shown schematically in FIG. 7, the plasma field may be a gliding arc plasma field 302 which is created by a gliding arc plasma generator 120. In the FIG. 7 example, the gliding arc plasma field 302 aids in the stabilization of at least one of the main flame 132 and pilot flame 134, at least by accelerating the reaction kinetics and allowing the main and/or pilot flames 132, 134 to exist in a higher speed flow and under a wider variety of adverse conditions than without plasma assist. If the plasma field were not present, the flame(s) would be blown downstream and extinguish if the flow speed is too high, or surge upstream, potentially causing an unwanted flashback if the flame speed is too low. In many cases, stabilizing the pilot flame 134 is sufficient as the pilot flame 134 will in turn, stabilize the main flame 132.

Figure 7:
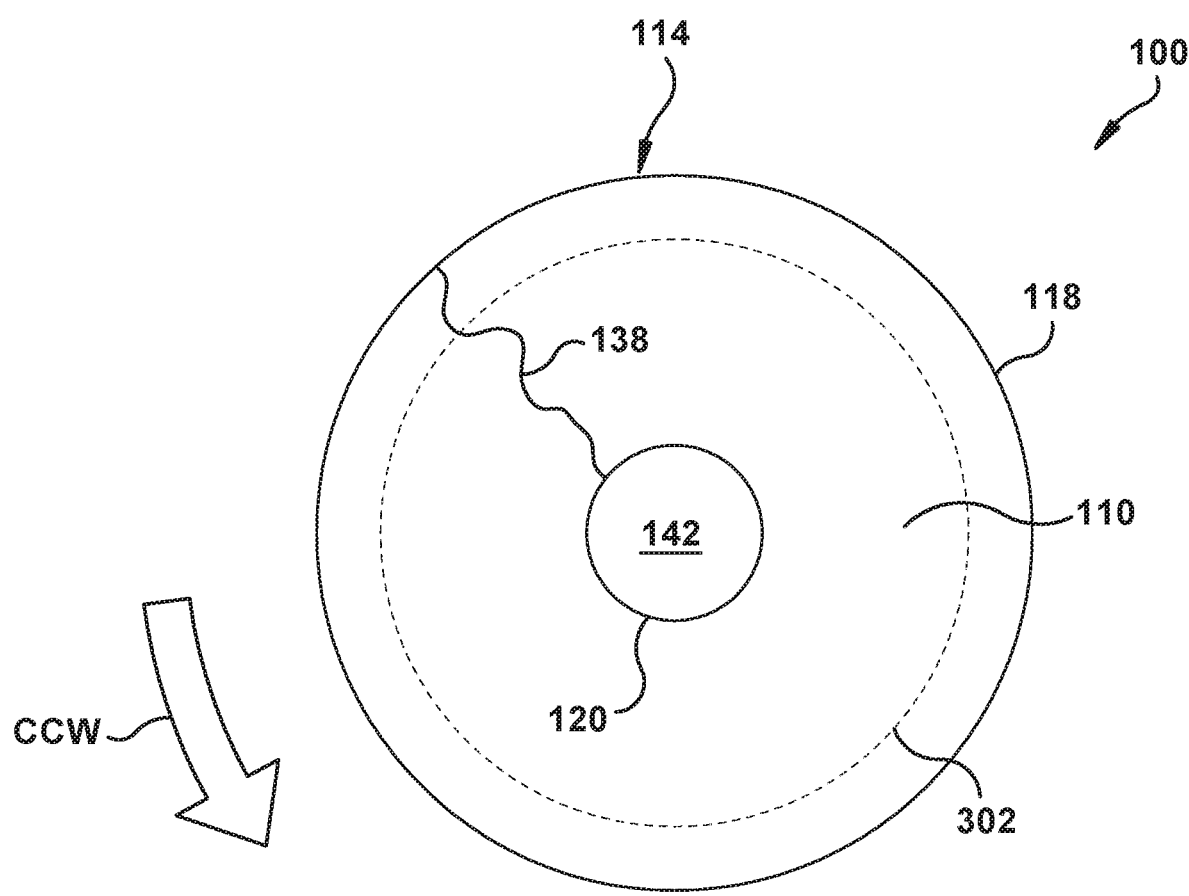
FIG. 7 is a schematic front view of the apparatus of FIG. 1.

FIG. 7 depicts an embodiment of the apparatus 100 wherein the electrode free end 142 is located within the fuel nozzle mixing chamber 110. FIG. 7 depicts an example plasma generator 120, with a plasma generator discharge 138 in the form of a gliding plasma arc 138 that extends to some surface of the fuel nozzle 118. The generator 120 may produce more than one plasma generator discharge 138 at any given moment, though a single gliding plasma arc 138 is shown in FIG. 7, for clarity. Any chosen plasma generator discharge 138 may be in electrical communication with any surface of the fuel nozzle 110, or of any other component of the apparatus 100, such as, but not limited to, the fuel nozzle mixer housing 202. In this embodiment, it is also contemplated that a helical aspect may be imparted on the air-fuel mixture by the tangential admission of at least one of air and fuel instead of by swirl vanes in a swirler assembly 102. Furthermore, it is contemplated that more than one plasma generator discharge 138 may be in electrical communication with any one location of the fuel nozzle 110.

As shown in FIG. 7, the plasma generator discharge 138 (here, a gliding plasma arc 138) is in electrical communication with a surface of the fuel nozzle 118. The gliding plasma arc 138 bridges a gap (shown schematically at G) between the electrode 140 and the fuel nozzle 118 through which the helically directed ("swirling") fuel-air mixture is flowing. (I.e., here the fuel-air mixture is spiraling in a counter-clockwise direction, shown by arrow CCW, out of the plane of the page in the orientation of FIG. 7.) When the gliding plasma arc 138 is subjected to the helical flow direction of the fuel-air mixture, the gliding plasma arc 138 is "blown" rapidly in the same direction as the flow of the fuel-air mixture. In other words, one end of the gliding plasma arc 138 remains relatively stationary at the electrode free end 142 while the opposite (laterally spaced) end of the gliding plasma arc 138 rotates rapidly around the circumference of the fuel nozzle 118. This spinning or twirling effect of the gliding plasma arc 138 creates a plasma field 302 that is in electrical communication with the fuel nozzle 118 and effectively encompasses a full 360 degrees around the electrode free end 142 of the plasma generator 120. (That is, viewed with the naked eye at operational speeds, the gliding plasma arc 138 is spun rapidly enough—through action of the helical flow direction of the fuel-air mixture— to appear to be a continuous disc-shaped plasma field 302.) Creating this effectively "continuous" plasma field 302 from the rapidly rotating gliding plasma arc 138 assists with causing a supermajority—up to substantially all—of the fuel-air mixture to encounter plasma energy as the fuel-air mixture passes through the apparatus 100. In this manner, the apparatus 100 can achieve a desired, and relatively high, level of fuel burning efficiency and/or flame stabilization.

FIG. 5 depicts an exploded perspective view of the apparatus 100. Here the swirler assembly 102 has been separated from the rest of the apparatus. As shown in FIG. 5, it is apparent that the swirler vanes 136 may exist in multiple ways. As shown, two rings of swirler vanes 136 may be included in the swirler body 107. Furthermore, one ring of the swirler vanes 136 extends laterally inwardly from the swirler assembly body 107 (e.g., from the swirler assembly inner wall 108) and the other ring of swirler vanes 136 extends laterally outwardly from the swirler assembly body 107 (e.g., from the swirler assembly inner wall 108). This configuration shown in FIG. 5 further includes a mounting bracket 304 for the apparatus 100, to connect the apparatus 100 to other components of a jet engine. The mounting bracket 304 may be configured to fit any desired one or more engine designs.

Figure 8:
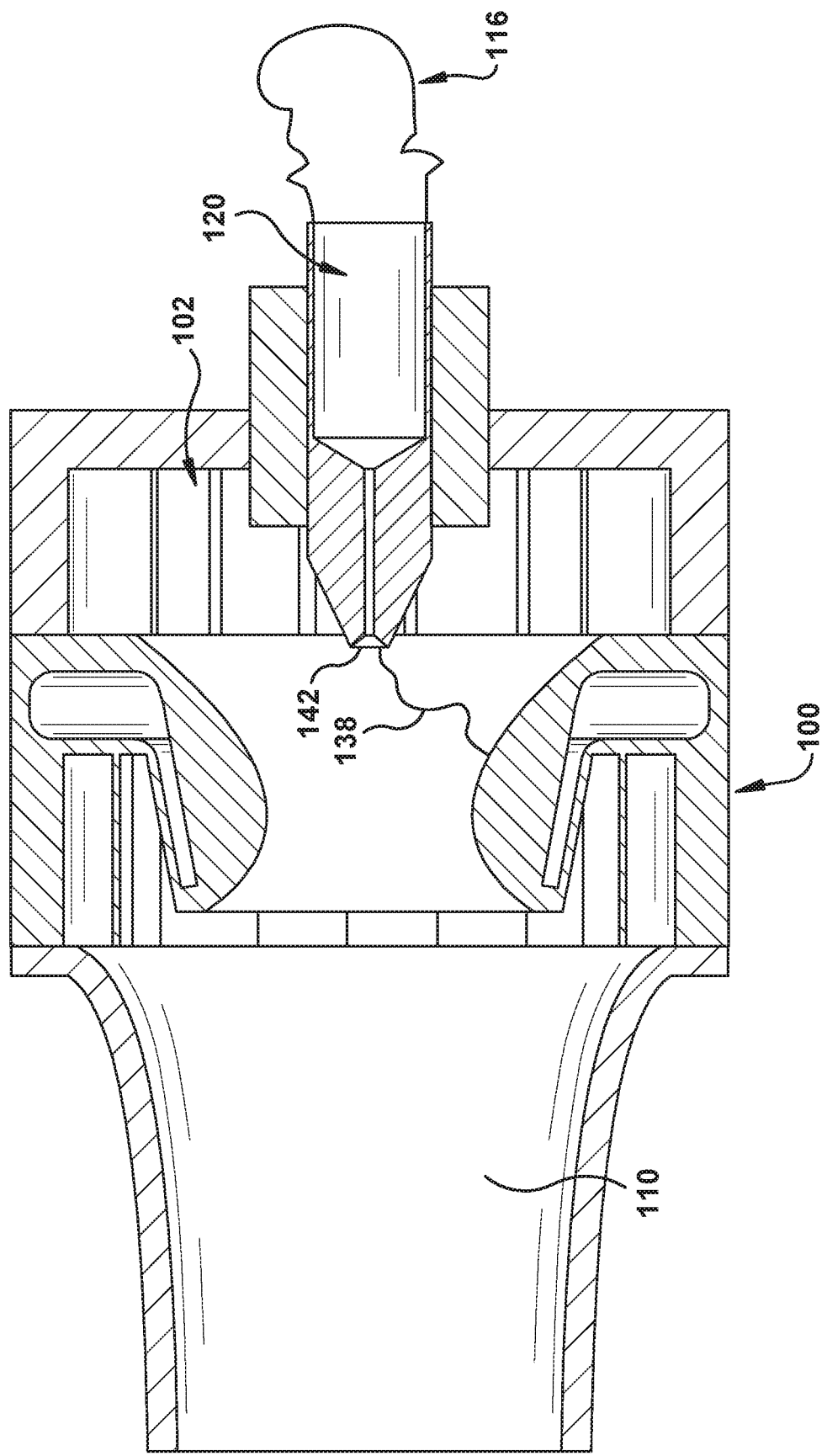
FIG. 8 is a cross-sectional view taken along line 2-2 of FIG. 1, with a fourth configuration of the apparatus.

FIG. 8 depicts a configuration of the apparatus 100 wherein the fuel mixing chamber 110 is elongated. The elongated fuel mixing chamber 110 may provide for a more homogenous fuel-air mixture to form. The plasma generator 120 depicted in this embodiment is also in fluid communication with the fuel nozzle fuel reservoir 116. Here, the plasma generator 120 serves as a method of fuel deliver into the fuel nozzle mixing chamber 110. The electrode free end 142 may then serve multiple purposes, such as to direct fuel into the fuel nozzle mixing chamber 110 as well as create a plasma generator discharge 138.

Figure 9:
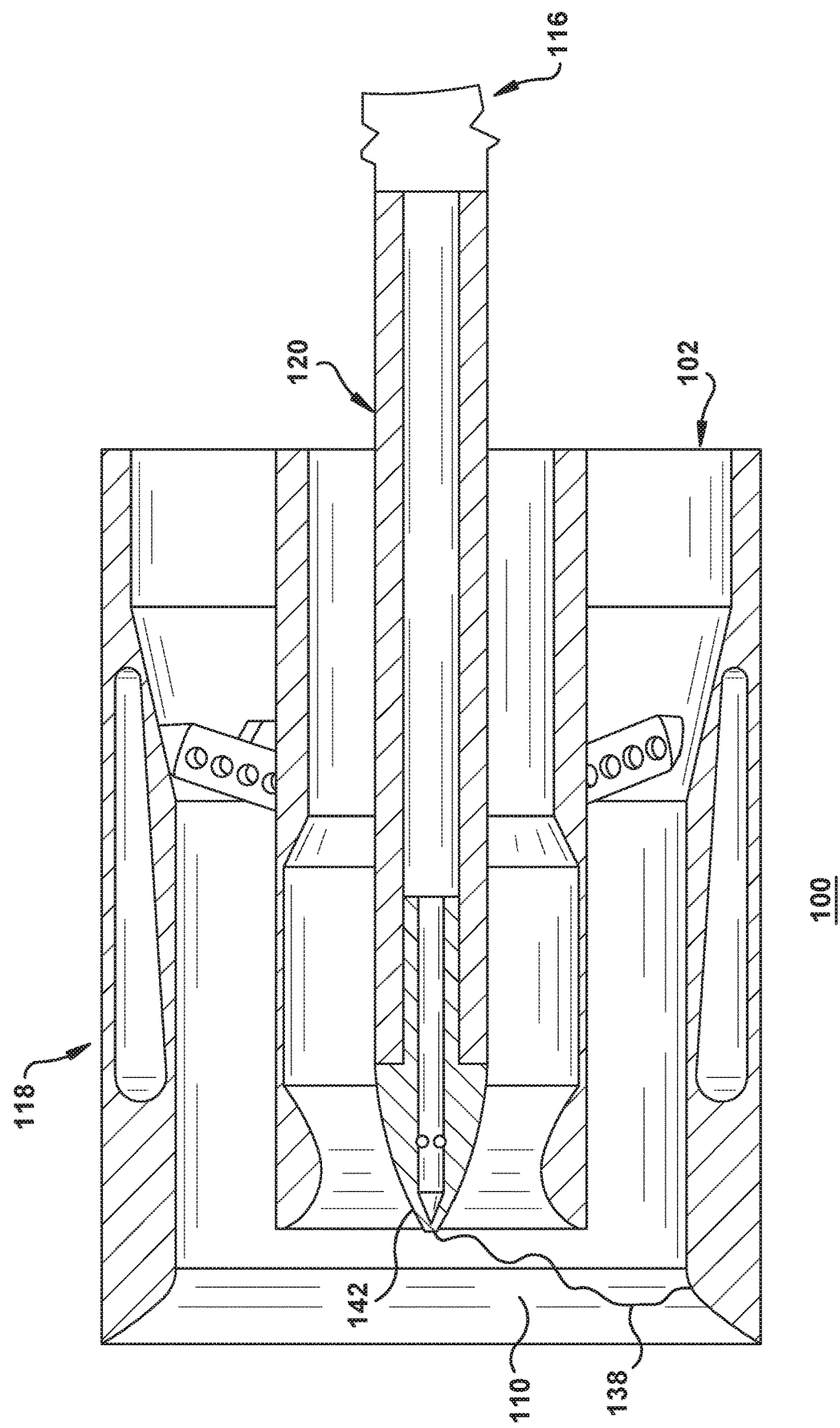
FIG. 9 is a cross-sectional view taken along line 2-2 of FIG. 1, with a fifth configuration of the apparatus.

FIG. 9 depicts an embodiment of the apparatus 100 wherein the plasma generator 120 is in fluid communication with the fuel nozzle mixing chamber 110. Again, the plasma generator may serve two purposes: to generate a plasma generator discharge 138, and to deliver fuel to the fuel nozzle mixing chamber 110. The plasma generator 120 depicted in this embodiment further includes a pointed electrode free end 142 geometry.

Figure 10:
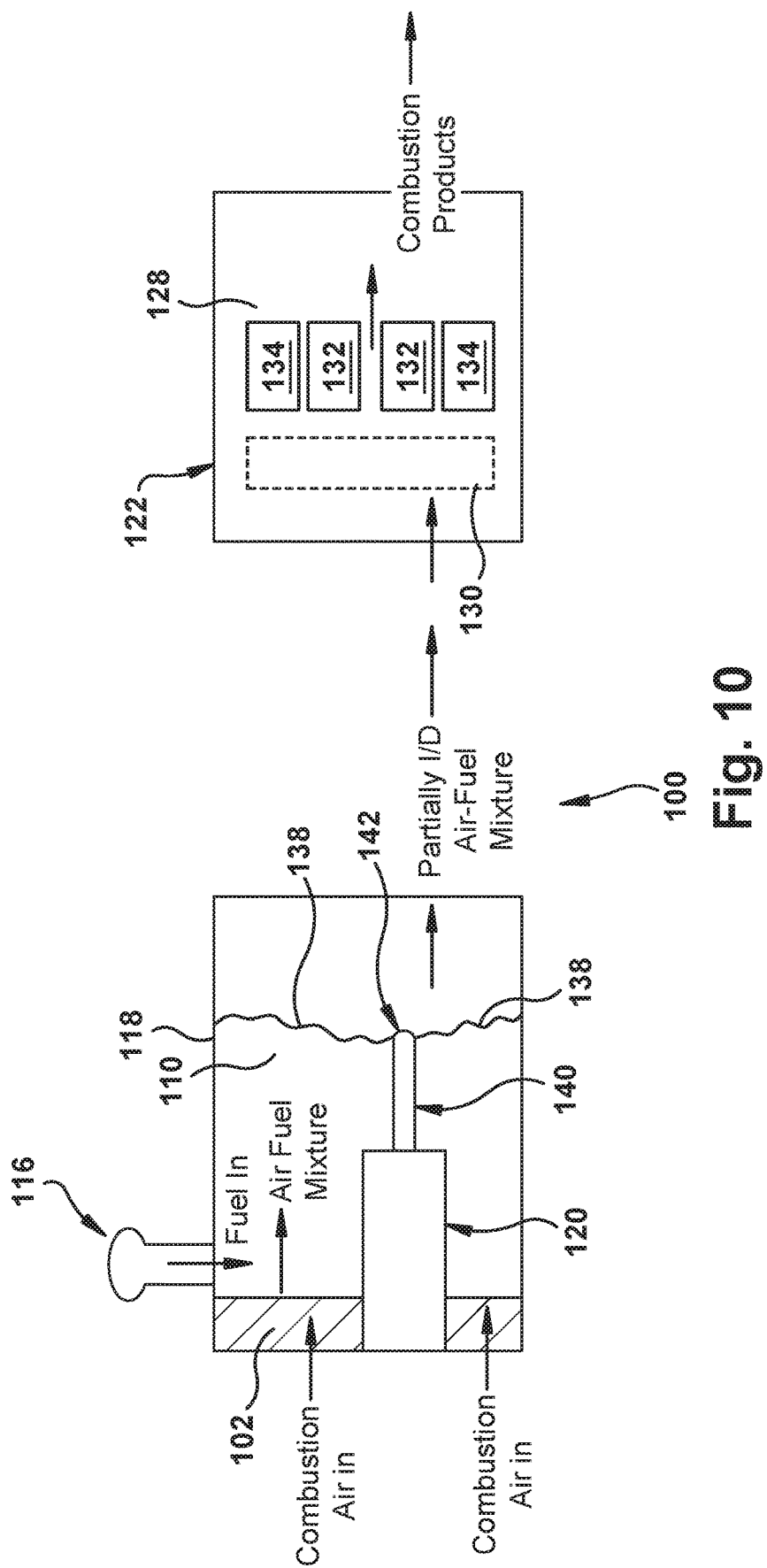
FIG. 10 is a schematic side view of the apparatus of FIG. 1, including details of operation and fluid flows.

FIG. 10 is a schematic depiction of the apparatus 100. The apparatus includes a swirler assembly 102, a fuel nozzle fuel reservoir 116, a plasma generator 120 that includes an electrode 140 and an electrode free end 142, a fuel nozzle 118, a fuel nozzle mixing chamber 110, a plasma generator discharge 138, a combustion chamber 122, a combustion chamber internal volume 128, a main flame 132, a pilot flame 134, and an R/R zone 130.

Figure 11:
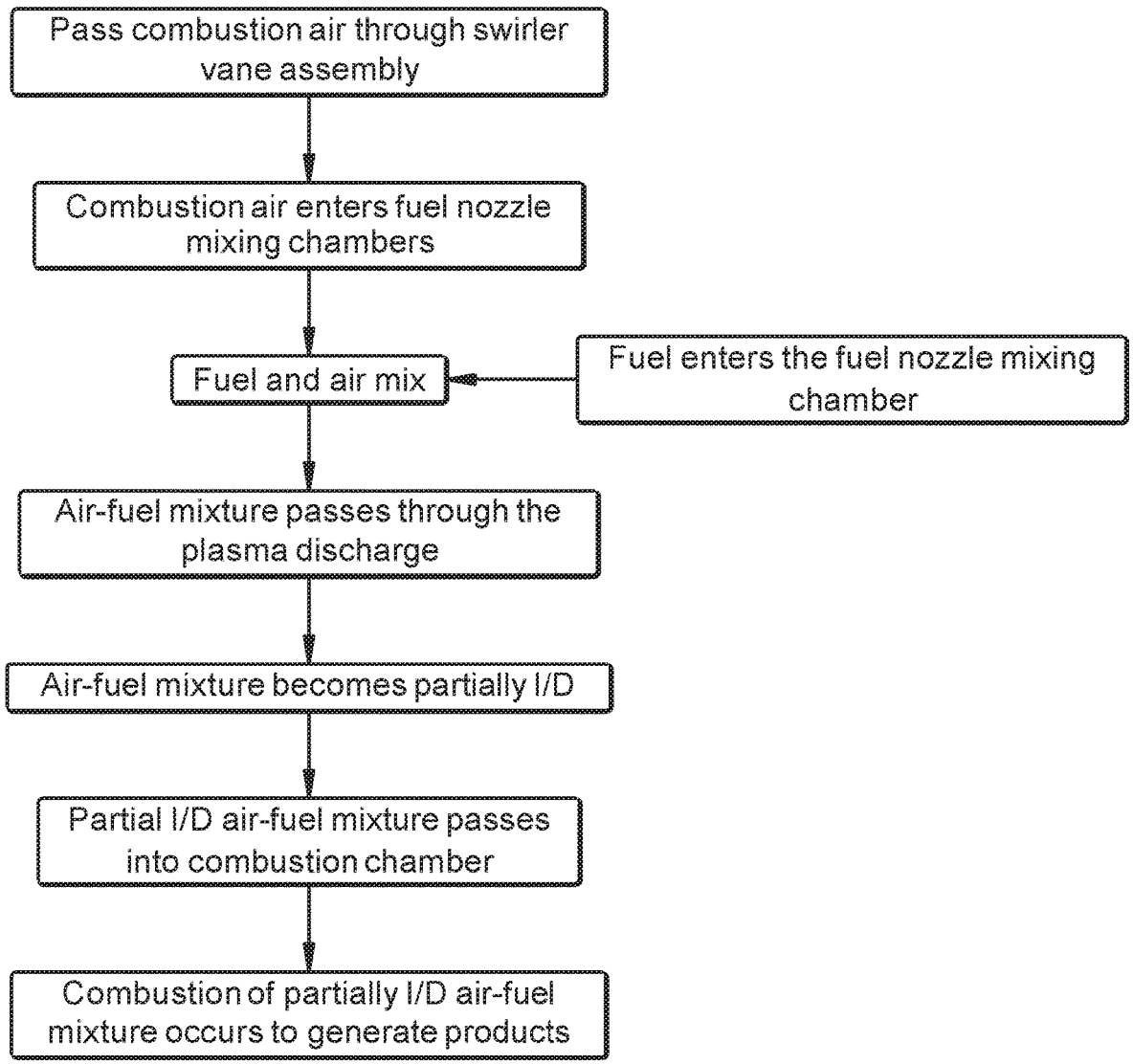
FIG. 11 is a flowchart describing at least a portion of a sequence of operation of the apparatus of FIG. 1.

FIG. 10 will be referenced during the below description of the operation of the apparatus 100 using the flowchart of FIG. 11. First, combustion air enters the swirler assembly inlet 104 (when present), flows through the swirler body 107, and exits the swirler body 107 through the swirler assembly outlet 106. When a swirler assembly 102 is present, the combustion air achieves a helical flow direction. Whether or not the combustion air is imparted the helical flow direction by a swirler assembly 102, however, the combustion air proceeds into the fuel nozzle mixing chamber 110. Fuel also enters into the fuel nozzle mixing chamber 110 from the fluidly connected fuel reservoir 116. The plasma generator 120 creates a plasma generator discharge 138 that is in electrical communication with both some surface of the fuel nozzle 118 (or any other desired surface of the apparatus 100) and the electrode free end 142. The fuel-air mixture created in the fuel nozzle mixing chamber 110 passes through the plasma generator discharge 138 to create an at least partially I/D air-fuel mixture. The at least partially I/D air-fuel mixture, comprising combustion air, then enters the combustion chamber internal volume 128 via the combustion chamber inlet 124. (In other words, the combustion of the at least partially I/D fuel-air mixture with the combustion air occurs at least partially within the combustion chamber internal volume 128 to responsively produce products.) The products then exit the combustion chamber internal volume 128 through the combustion chamber outlet 126.

Various aspects of the operation of the apparatus 100 can be controlled in any desired manner. For example, the plasma generator 120 may at least partially control the rate of at least one of (1) at least partial air-fuel ionization and/or dissociation and (2) fuel combustion within the combustion chamber 122. This is accomplished by user control (automatically and/or manually, in response to any desired inputs) of the energy provided to the plasma generator 120. As another example of control within the apparatus 100, the plasma generator 120 can at least partially ionize and/or dissociate the fuel-air mixture responsive to control commands, from any desired source (e.g., a Full Authority Digital Engine Control ["FADEC"], not shown), for combustion by at least one of the main flame 132 and the pilot flame 134. This control system may gather information about mass flow rate, combustion or other relative parameters by sensing the electrical properties of the discharge.

As yet another example of control within the apparatus 100, an ignition source (shown schematically at 306 in FIG. 2 as a pilot burner and operatively connected to the plasma generator 120) may be located at least partially within a selected one of the fuel nozzle mixing chamber 110 and the combustion chamber 122. The ignition source 306, when present, may alter the rate of at least partial fuel-air ionization and/or dissociation responsive to variant operating conditions. Accordingly, there may be one or more sensors (not shown), of any suitable type, such as, but not limited to, pressure, temperature, electrical field, or any combination thereof, provided at any desired location(s) in/near the apparatus 100, to provide the ignition source 306, directly or via a control device, with information on the variant operating conditions such that the plasma is modulated to ensure desired combustion stability.

Another way of thinking about at least a portion of the operation of the apparatus 100 is to consider that at least one of aerodynamic swirl and Lorentz force from an external magnetic field are used to impart a rotation to the at least partially I/D fuel-air mixture. This rotation is oriented substantially about a rotational axis substantially parallel to a longitudinal axis of the plasma generator 120. The rotation contributes to a quasi-spatially uniform discharge of the at least partially I/D fuel-air mixture from the plasma generator 120.

To provide an orientation to basic structures associated with the apparatus 100, FIG. 2 includes several numbered elements. To avoid visual distractions, these element numbers are not carried throughout all of the Figures, but one of ordinary skill in the art would understand the structures of the configurations shown in other Figures based at least upon the labels given in FIG. 2. For example, the apparatus 100 includes, or is otherwise associated with, a mixer 204, a radial swirl vane 206 of the mixer 204, a main fuel delivery orifice 208, a main fuel annulus 210, a ceramic insulator 212, a pilot fuel in 214, an inner swirler vane 216, an annular flow separator 218, an outer swirler vane 220, a main fuel delivery line 222, a pilot fuel delivery orifice 224, a prefimling surface for pilot fuel 226, and a venturi throat of the fuel nozzle 228.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An apparatus for assisting with the combustion of fuel, the apparatus comprising:

a swirler assembly having at least one swirler assembly inlet and at least one swirler assembly outlet longitudinally separated from the at least one swirler assembly inlet by a swirler body defining a swirler assembly inner wall;

a fuel nozzle, having a fuel nozzle mixing chamber, a fuel nozzle air inlet, and a fuel nozzle air outlet, the fuel nozzle mixing chamber being in fluid communication with both a fuel nozzle fuel reservoir and the fuel nozzle air inlet, the fuel nozzle air inlet allowing air to flow into the fuel nozzle, wherein fuel from the fuel nozzle fuel reservoir is directed into the fuel nozzle mixing chamber and, inside the fuel nozzle mixing chamber, the fuel combines with air therein to form a fuel-air mixture;

at least one plasma generator located at least partially within the fuel nozzle, the plasma generator at least partially ionizing and/or dissociating the fuel-air mixture to generate an at least partially ionized/dissociated fuel-air mixture ("at least partially I/D fuel-air mixture") comprising at least one of an at least partially ionized fuel-air mixture and an at least partially dissociated fuel-air mixture via a plasma generator discharge;

a combustion chamber having a combustion chamber inlet in fluid communication with the swirler assembly outlet, the combustion chamber having a combustion chamber outlet, the combustion chamber inlet and outlet being longitudinally separated by a combustion chamber internal volume including a reaction/recirculation ("R/R") zone, a main flame, and a pilot flame, the combustion chamber inlet admitting the at least partially I/D fuel-air mixture from the plasma generator into the combustion chamber internal volume;

wherein combustion air enters the swirler assembly inlet, flows through the swirler body, and exits the swirler body through the swirler assembly outlet, the combustion air flowing from the swirler assembly outlet into the combustion chamber internal volume through the combustion chamber inlet;

wherein combustion of the at least partially I/D fuel-air mixture with the combustion air occurs at least partially within the combustion chamber internal volume to responsively produce products, the products exiting the combustion chamber internal volume through the combustion chamber outlet; and wherein the plasma generator ionizes and/or dissociates the fuel-air mixture responsive to control commands, for combustion by at least one of the main flame and the pilot flame.

2. The apparatus as set forth in claim 1 wherein the plasma generator at least partially controls the rate of at least one of partial fuel-air ionization and/or dissociation and fuel combustion within the combustion chamber.

3. The apparatus as set forth in claim 1 wherein the fuel nozzle fuel reservoir is a gaseous fuel source.

4. The apparatus as set forth in claim 1 wherein the fuel nozzle fuel reservoir is a liquid fuel source.

5. The apparatus as set forth in claim 1 wherein the plasma generator includes a gliding arc plasma generator.

6. The apparatus as set forth in claim 5, wherein the gliding arc plasma generator creates a gliding plasma arc that is in electrical communication with both the plasma generator and a surface of the fuel nozzle.

7. The apparatus as set forth in claim 6, including a fuel nozzle mixer housing that is in fluid communication with the fuel nozzle fuel reservoir and at least partially laterally surrounds the fuel nozzle, wherein the plasma generator creates a gliding plasma arc that is in electrical communication with both the plasma generator and a surface of the fuel nozzle mixer housing.

8. The apparatus as set forth in claim 1, the plasma generator includes an electrode having an electrode free end, wherein the plasma generator discharge extends at least one of laterally and longitudinally outward from the electrode free end into the combustion chamber.

9. The apparatus as set forth in claim 1 wherein the plasma generator is at least one of a nanosecond pulsed plasma generator, a dielectric barrier discharge plasma generator, a radiofrequency discharge plasma generator, a laser plasma generator, and a microwave plasma generator.

10. The apparatus as set forth in claim 1, wherein the plasma generator discharge is at least one of a gliding arc discharge, a streamer discharge, a dielectric barrier discharge, an RF discharge, and a nanosecond pulsed discharge.

11. The apparatus as set forth in claim 1, including an ignition source located at least partially within a selected one of the fuel nozzle mixing chamber and the combustion chamber, the ignition source altering the rate of at least partial fuel-air ionization and/or dissociation responsive to variant operating conditions.

12. The apparatus as set forth in claim 1, wherein the plasma generator discharge is a gliding arc plasma field and the gliding arc plasma field stabilizes at least one of the main flame and pilot flame.

13. The apparatus as set forth in claim 1, the plasma generator including an electrode having an electrode free end, the electrode extending from a remaining portion of the plasma generator longitudinally to place the electrode free end substantially within a lateral plane defined by the fuel nozzle air outlet.

14. The apparatus as set forth in claim 13, wherein the plasma generator discharge is a plasma field that is in electrical communication with the electrode free end and the fuel nozzle air outlet.

15. The apparatus as set forth in claim 1, wherein the plasma generator includes an electrode having an electrode free end, the electrode extending from a remaining portion of the plasma generator to interpose a lateral plane formed by the fuel nozzle air outlet longitudinally between the fuel nozzle mixing chamber and the electrode free end.

16. The apparatus as set forth in claim 15, wherein the plasma generator discharge is a plasma field that is in electrical communication with the electrode free end and a surface of the fuel nozzle.

17. The apparatus as set forth in claim 1, the plasma generator including an electrode having an electrode free end, the electrode being wholly located within the fuel nozzle mixing chamber.

18. The apparatus as set forth in claim 17, wherein the plasma generator discharge is a plasma field that is in electrical communication with the electrode free end and the fuel nozzle.

19. An apparatus for assisting with the combustion of fuel, the apparatus comprising:

a fuel nozzle, having a fuel nozzle mixing chamber, a fuel nozzle air inlet, and a fuel nozzle air outlet, the fuel nozzle mixing chamber being in fluid communication with both a fuel nozzle fuel reservoir and the fuel nozzle air inlet, the fuel nozzle air inlet allowing combustion air to flow into the fuel nozzle, wherein fuel from the fuel nozzle fuel reservoir is directed into the fuel nozzle mixing chamber and, inside the fuel nozzle mixing chamber, the fuel combines with air therein to form a fuel-air mixture;

at least one plasma generator located at least partially within the fuel nozzle, the plasma generator at least partially ionizing and/or dissociating the fuel-air mixture to generate an at least partially ionized/dissociated fuel-air mixture ("at least partially I/D fuel-air mixture") comprising at least one of an at least partially ionized fuel-air mixture and an at least partially dissociated fuel-air mixture via a plasma generator discharge, the plasma generator discharge in electrical communication with the plasma generator and the fuel nozzle;

a combustion chamber having a combustion chamber inlet in fluid communication with the fuel nozzle air outlet, the combustion chamber having a combustion chamber outlet, the combustion chamber inlet and outlet being longitudinally separated by a combustion chamber internal volume including a reaction/recirculation ("R/R") zone, a main flame, and a pilot flame, the combustion chamber inlet admitting the at least partially I/D fuel-air mixture from the plasma generator into the combustion chamber internal volume;

wherein combustion of the at least partially I/D fuel-air mixture with the combustion air occurs at least partially within the combustion chamber internal volume to responsively produce products, the products exiting the combustion chamber internal volume through the combustion chamber outlet.

20. The apparatus as set forth in claim 19, wherein the plasma generator discharge is a plasma field that is in electrical communication with the electrode free end and the fuel nozzle air outlet.

21. The apparatus as set forth in claim 19, wherein the plasma generator includes an electrode protruding from a remaining portion of the plasma generator, the electrode having an electrode free end, the plasma generator discharge extending at least one of laterally and longitudinally outward from the electrode free end into the combustion chamber.

22. The apparatus as set forth in claim 19, wherein the plasma generator includes an electrode having an electrode free end, the electrode extending from a remaining portion of plasma generator longitudinally to place the electrode tree end substantially within a lateral plane defined by the fuel nozzle air outlet.

23. The apparatus as set forth in claim 19, the plasma generator including an electrode having an electrode free end, the electrode extending from a remaining portion of the plasma generator to interpose a lateral plane formed by the fuel nozzle air outlet longitudinally between the fuel nozzle mixing chamber and the electrode free end.

24. The apparatus as set forth in claim 23, wherein the plasma generator discharge is a plasma field that is in electrical communication with the electrode free end and a surface of the fuel nozzle.

25. The apparatus as set forth in claim 19, the plasma generator including an electrode having an electrode free end, the electrode being wholly located within the fuel nozzle mixing chamber.

26. A method for assisting with the combustion of fuel comprising:
providing an apparatus including:
a fuel nozzle, having a fuel nozzle mixing chamber, a fuel nozzle air inlet, and a fuel nozzle air outlet, the fuel nozzle mixing chamber being in fluid communication with both a fuel nozzle fuel reservoir and the fuel nozzle air inlet, the fuel nozzle air inlet allowing air to flow into the fuel,
at least one plasma generator located at least partially within the fuel nozzle, and
a combustion chamber having a combustion chamber inlet in fluid communication with the swirler assembly outlet, the combustion chamber having a combustion chamber outlet, the combustion chamber inlet and outlet being longitudinally separated by a combustion chamber internal volume, the combustion chamber internal volume including a reaction/recirculation ("R/R") zone, a main flame, and a pilot flame;
providing fuel to the fuel nozzle mixing chamber from the fuel nozzle fuel reservoir,
creating a fuel-air mixture by combining fuel and air within the fuel nozzle mixing chamber;
creating a plasma field with a plasma generator located at least partially within the fuel nozzle;
creating, with the plasma generator, an at least partially ionized/dissociated fuel-air mixture ("at least partially I/D fuel-air mixture") comprising at least one of an at least partially ionized fuel-air mixture and an at least partially dissociated fuel-air mixture from at least a portion of the fuel-air mixture;
combusting at least a portion of the fuel-air mixture in the combustion chamber with the plasma field generated from the at least partially I/D fuel-air mixture to produce products;
locating an ignition source at least partially within a selected one of the fuel nozzle mixing chamber and the combustion chamber; and
altering the rate of at least partial fuel-air ionization and/or dissociation with the ignition source responsive to variant operating conditions.

27. The method of claim 26, including:
providing a swirler assembly having at least one swirler assembly inlet and at least one swirler assembly outlet longitudinally separated from the at least one swirler assembly inlet by a swirler body defining a swirler assembly inner wall; and
passing combustion air through the swirler assembly inlet, through the swirler body, and the combustion air exiting the swirler body through the swirler assembly outlet to impart a helical aspect to the flow direction of the combustion air.

28. The method of claim 26, including at least partially controlling the rate of at least one of partial fuel-air ionization and/or dissociation and fuel combustion within the combustion chamber via the plasma generator.

29. The method of claim 26, including:
providing control commands; and
ionizing and/or dissociating the fuel-air mixture responsive to the control commands, for combustion by at least one of the main flame and the pilot flame.

30. The method of claim 26, wherein the plasma generator includes a gliding arc plasma generator and including creating, with the plasma generator, a gliding plasma arc that is in electrical communication with both the plasma generator and a surface of the fuel nozzle.

31. The method of claim 30, including:
at least partially laterally surrounding the fuel nozzle with a fuel nozzle mixer housing; and
creating a gliding plasma arc that is in electrical communication with both the plasma generator and a surface of the fuel nozzle mixer housing.

32. The method of claim 26, including:
providing the plasma generator with an electrode having an electrode free end; and
extending the plasma generator discharge at least one of laterally and longitudinally outward from the electrode free end into the combustion chamber.

33. The method of claim 26, wherein the plasma generator discharge is a gliding arc plasma field and including stabilizing at least one of the main flame and pilot flame with the gliding arc plasma field.

34. The method of claim 26, including:
providing the plasma generator with an electrode having an electrode free end; and
extending the electrode from a remaining portion of the plasma generator longitudinally to place the electrode free end substantially within a lateral plane defined by the fuel nozzle air outlet.

35. The method of claim 26, including:
providing the plasma generator with an electrode having an electrode free end; and
extending the electrode from a remaining portion of the plasma generator to interpose a lateral plane formed by the fuel nozzle air outlet longitudinally between the fuel nozzle mixing chamber and the electrode free end.

36. The method of claim 26, including:
providing the plasma generator with an electrode having an electrode free end; and
extending the electrode from a remaining portion of the plasma generator longitudinally to place the electrode free end substantially within a lateral plane defined by the fuel nozzle air outlet.

* * * * *